United States Patent
Suzuki

(10) Patent No.: US 9,132,789 B2
(45) Date of Patent: Sep. 15, 2015

(54) CLIP

(75) Inventor: Keisuke Suzuki, Utsunomiya (JP)

(73) Assignee: NIFCO INC., Yokohama-Shi, Kanagawa (JP)

( * ) Notice: Subject to any disclaimer, the term of this patent is extended or adjusted under 35 U.S.C. 154(b) by 301 days.

(21) Appl. No.: 13/518,221

(22) PCT Filed: Dec. 17, 2010

(86) PCT No.: PCT/JP2010/007335
§ 371 (c)(1),
(2), (4) Date: Jul. 27, 2012

(87) PCT Pub. No.: WO2011/077682
PCT Pub. Date: Jun. 30, 2011

(65) Prior Publication Data
US 2012/0291240 A1    Nov. 22, 2012

(30) Foreign Application Priority Data
Dec. 24, 2009    (JP) .............................. 2009-292287

(51) Int. Cl.
| | |
|---|---|
| *F16B 19/00* | (2006.01) |
| *B60R 13/02* | (2006.01) |
| *B60R 21/213* | (2011.01) |
| *F16B 21/07* | (2006.01) |

(Continued)

(52) U.S. Cl.
CPC ........... *B60R 13/0206* (2013.01); *B60R 21/213* (2013.01); *F16B 19/1081* (2013.01); *F16B 21/075* (2013.01); *F16B 5/065* (2013.01); *F16B 5/0635* (2013.01); *Y10T 24/309* (2015.01); *Y10T 24/45623* (2015.01)

(58) Field of Classification Search
CPC ... B16R 13/0206; F16B 5/065; B60R 21/213; B60R 13/0206
USPC ..................... 24/289, 297, 453, 633
See application file for complete search history.

(56) References Cited

U.S. PATENT DOCUMENTS

| 6,952,863 B2 * | 10/2005 | Draggoo et al. ................. 24/297 |
| 7,073,231 B2 * | 7/2006 | Draggoo et al. ................. 24/297 |

(Continued)

FOREIGN PATENT DOCUMENTS

| JP | 2000-142301 A | 5/2000 |
| JP | 2001-165134 A | 6/2001 |

(Continued)

*Primary Examiner* — Robert J Sandy
*Assistant Examiner* — Michael Lee
(74) *Attorney, Agent, or Firm* — Manabu Kanesaka

(57) ABSTRACT

A clip includes a first member engaging a first attached member, and a second member supported in the first member and engaging a second attached member. The clip connects both attached members, and when a load acts in a direction separating both attached members, the clip allows a separation of both attached members only for a predetermined distance. The first member includes a base portion engaging the first attached member, a protruding piece portion in the base portion, and an expanded head portion wider than the protruding piece portion formed in an end portion of the protruding piece portion. The second member includes a through hole through which the protruding piece portion loosely passes, and a cylinder portion supported in the protruding piece portion to be displaced in a protruding direction thereof, and also retained in the protruding piece portion by the base portion and the expanded head portion.

8 Claims, 11 Drawing Sheets

(51) Int. Cl.
*F16B 19/10* (2006.01)
*F16B 5/06* (2006.01)

(56) References Cited

U.S. PATENT DOCUMENTS

| | | | |
|---|---|---|---|
| 7,077,449 B2 | 7/2006 | Tokunaga | |
| 7,549,199 B2 * | 6/2009 | Bugner | 24/297 |
| 7,976,056 B2 | 7/2011 | Kirchen et al. | |
| 8,297,646 B2 * | 10/2012 | Aoki | 280/728.2 |
| 8,430,421 B2 | 4/2013 | Kirchen et al. | |
| 2004/0052575 A1 | 3/2004 | Draggoo et al. | |
| 2013/0152346 A1 * | 6/2013 | Kim et al. | 24/289 |

FOREIGN PATENT DOCUMENTS

| | | |
|---|---|---|
| JP | 2002-037007 A | 2/2002 |
| JP | 2010-159013 A | 7/2010 |
| WO | 2008141052 A2 | 11/2008 |
| WO | 2009/039276 A1 | 3/2009 |
| WO | WO 2009/063715 A1 | 5/2009 |
| WO | 2010016982 A1 | 2/2010 |

* cited by examiner

CLIP

RELATED APPLICATIONS

The present application is National Phase of International Application No. PCT/JP2010/007335 filed Dec. 17, 2010, and claims priority from Japanese Application No. 2009-292287, filed Dec. 24, 2009.

FIELD OF TECHNOLOGY

The present invention relates to a clip, more specifically, in a structure housing an air-bag between a car body panel and a garnish, a clip being used for attaching the garnish to a car body frame, and extending at a time of an expansion of the air-bag so as to form a gap between the garnish and the car body frame.

BACKGROUND ART

In an air-bag device for an automobile in which the air-bag is housed between the car body panel such as a front pillar, a roof panel, and the like, and the garnish, there is one in which the car body panel and the garnish are connected using the clip which deforms (extends) when a load acts, in order to facilitate the expansion of the air-bag by enlarging the gap between the car body panel and the garnish at the time of the expansion of the air-bag (for example, Patent Document 1).

The clip according to the Patent Document 1 is structured by a cylinder member engaging with a hole formed in the car body panel; and a column member slidably supported in the cylinder member, and also engaging with the garnish in one end. When a predetermined load acts in a direction wherein the column member protrudes from the cylinder member, the column member protrudes from the cylinder member so as to be capable of separating the car body panel and the garnish.

Also, as another example, there is a heretofore known clip structured by a base portion engaging with the car body panel; a belt-like portion provided to protrude in the base portion; a wide portion provided in a base end portion of the belt-like portion; and an expanded head portion provided in an end portion of the belt-like portion (for example, Patent Document 2). In the clip, at a normal time, the wide portion engages a hole formed in the garnish, and fixes the garnish in the car body panel, and at the time of the expansion of the air-bag, an engagement between the wide portion and the hole of the garnish is released, and the belt-like portion is pulled from the hole of the garnish until the expanded head portion is caught on the hole of the garnish. Thereby, the clip can separate the car body panel and the garnish only for a length of the belt-like portion.

PRIOR ART DOCUMENT

Patent Document

Patent Document 1: Japanese Unexamined Patent Publication No. 2002-37007
Patent Document 2: Japanese Patent Publication No. 3633537

SUMMARY OF THE INVENTION

Problems to be Solved by the Invention

In the clip according to the Patent Document 1, however, there is a problem that when a load acts in a direction oblique to an axis like of the cylinder member and the column member, a twisting occurs between the cylinder member and the column member, and the car body panel and the garnish cannot be smoothly separated relative to a desired load. Also, in the clip according to the Patent Document 2, due to the release of the engagement between the wide portion and the hole of the garnish, the car body panel and the garnish are separated, so that there is a problem that it is difficult to stabilize an amount of the load releasing the engagement. This is because since the clip and the garnish are generally manufactured in a different place and manufacturing process, it is difficult to correspond the wide portion of the clip and the hole of the garnish with an excellent accuracy.

The present invention is made in view of the aforementioned problems, and an object of the present invention is to provide a clip capable of smoothly separating the garnish and the car body panel relative to a load in various directions acting on the garnish and the car body panel in a case where the desired load acts. Namely, the object of the present invention is to provide a clip capable of being smoothly displaced even relative to the load in the direction oblique to a displacement direction of the clip.

Means for Solving the Problems

In order to solve the aforementioned problems, the present invention is a clip (10) which includes a first member (11) engaging with a first attached member (100), and a second member (12) supported in the first member, and also engaging with a second attached member (101). The clip (10) mutually connects both the attached members, and also when a load acts in a direction wherein both the attached members are separated from each other, the clip (10) allows a mutual separation of both the attached members only for a predetermined distance. The first member comprises a base portion (15) engaging with the first attached member, a protruding piece portion (16) provided to protrude in the base portion, and an expanded head portion (17) wider than the protruding piece portion formed in an end portion of the protruding piece portion. The second member comprises a through hole (52) in which the protruding piece portion loosely passes through, and a cylinder portion (51) supported in the protruding piece portion so as to be capable of being displaced in a protruding direction thereof, and also retained from the protruding piece portion by the base portion and the expanded head portion. The base portion and the cylinder portion are connected by engaging portions (35 and 64) which release an engagement with a load smaller than an engagement between the base portion and the first attached member and an engagement between the cylinder portion and the second attached member. In a state wherein the engagement of the engaging portions is released, the cylinder portion has a characteristic in that an axis line thereof is supported in the protruding piece portion so as to be capable of inclining (sloping) relative to the protruding direction of the protruding piece portion.

According to the present structure, when a predetermined load acts on the first member and the second member, the engagement between the base portion and the cylinder portion is released, and the cylinder portion is displaced along the protruding piece portion. Namely, a relative position between the first member and the second member is displaced, and a relative position between the first attached member and the second attached member is displaced. At that time, since the cylinder portion can slope relative to the protruding direction of the protruding piece portion, even in a case wherein a direction of the load acted on the second member slopes relative to the protruding direction of the protruding piece portion, the second member can be smoothly displaced relative to the first member without a twisting of the first member and the second member.

Another aspect of the present invention has characteristics wherein the through hole includes an elastic piece (54) which can be displaced in a direction orthogonal to an axis line direction of the through hole in a hole wall thereof; the elastic piece includes a projection (55) protruding to a center side of the through hole; and the protrusion abuts against the expanded head portion so as to retain the cylinder portion relative to the protruding piece portion.

According to the present structure, a combination of the first member and the second member can be easily carried out with a simple structure.

Another aspect of the present invention has a characteristic wherein the protruding piece portion has a flexible property.

According to the present structure, since the protruding piece portion can bend, even in the case wherein the direction of the load acted on the second member slopes relative to the protruding direction of the protruding piece portion, the second member can be smoothly displaced relative to the first member without the twisting of the first member and the second member.

Another aspect of the present invention has a characteristic wherein in a state of being engaged by the engaging portions, the cylinder portion and the base portion mutually include a play (71 and 72) between the cylinder portion and the base portion.

According to the present structure, since the second member can be displaced relative to the first member only for a portion of the play, even in the case wherein the direction of the load acted on the second member slopes relative to the protruding direction of the protruding piece portion, the twisting between the first member and the second member is prevented, and the engagement between the base portion and the cylinder portion is smoothly released by a desired load.

Effect of the Invention

According to the aforementioned structure, the first member and the second member are relatively displaced relative to the desired load, and the clip can separate a member engaging with the first member (for example, a front pillar) and a member engaging with the second member (for example, a garnish).

BEST MODES OF CARRYING OUT THE INVENTION

Hereinafter, with reference to drawings, embodiments wherein the present invention is applied to a clip for attaching a garnish to a front pillar upper of an automobile will be explained in detail. In a void formed between the front pillar upper and the garnish, there is housed an air-bag of a side curtain air-bag device. When the air-bag expands, and a load (an expansion pressure) acts in a direction wherein the front pillar upper and the garnish are separated from each other, the clip according to the embodiment allows a separation between the front pillar upper and the garnish only for a predetermined distance, and forms a gap between the front pillar upper and the garnish. Hereinafter, the clip according to the embodiment will be explained based on a coordinate axis shown in each figure.

Figure 1:
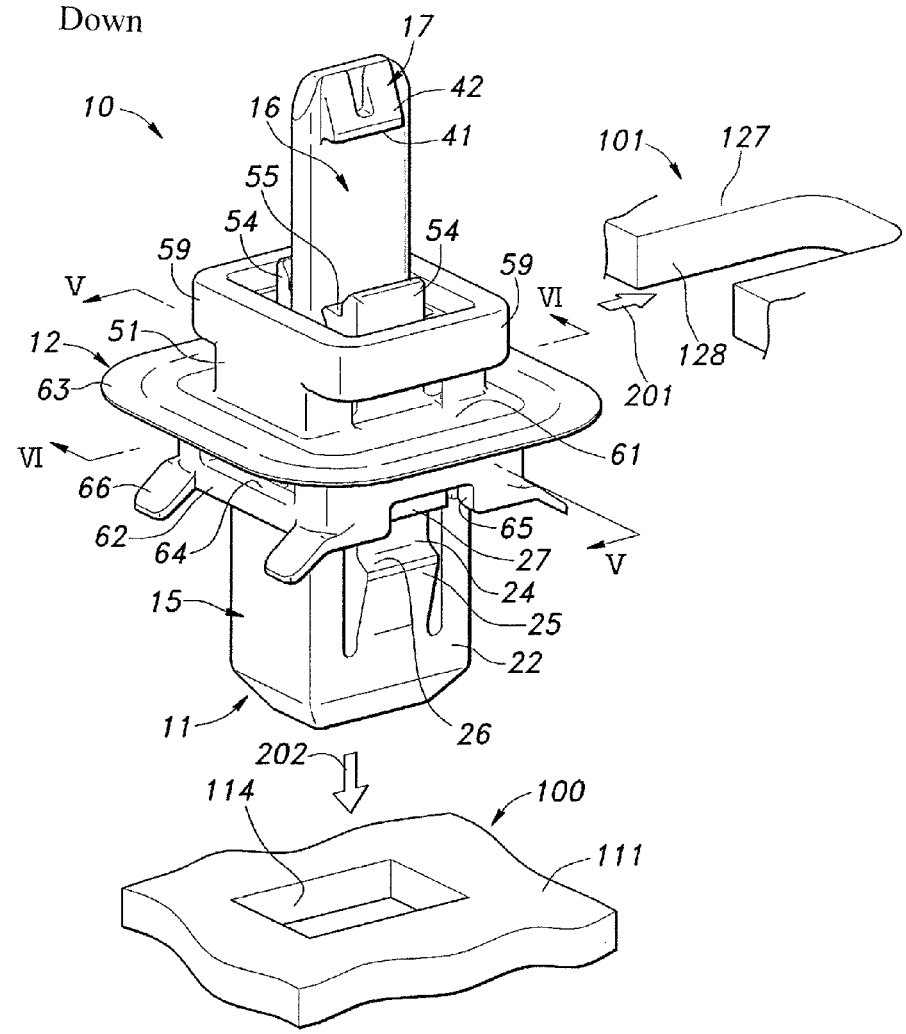
FIG. 1 is a perspective view showing an initial state of a clip according to an embodiment.

As shown in FIG. 1, a clip 10 according to the embodiment is structured by a first member 11 and a second member 12. The first member 11 and the second member 12 are respectively molded by a resin material.

Figure 2:
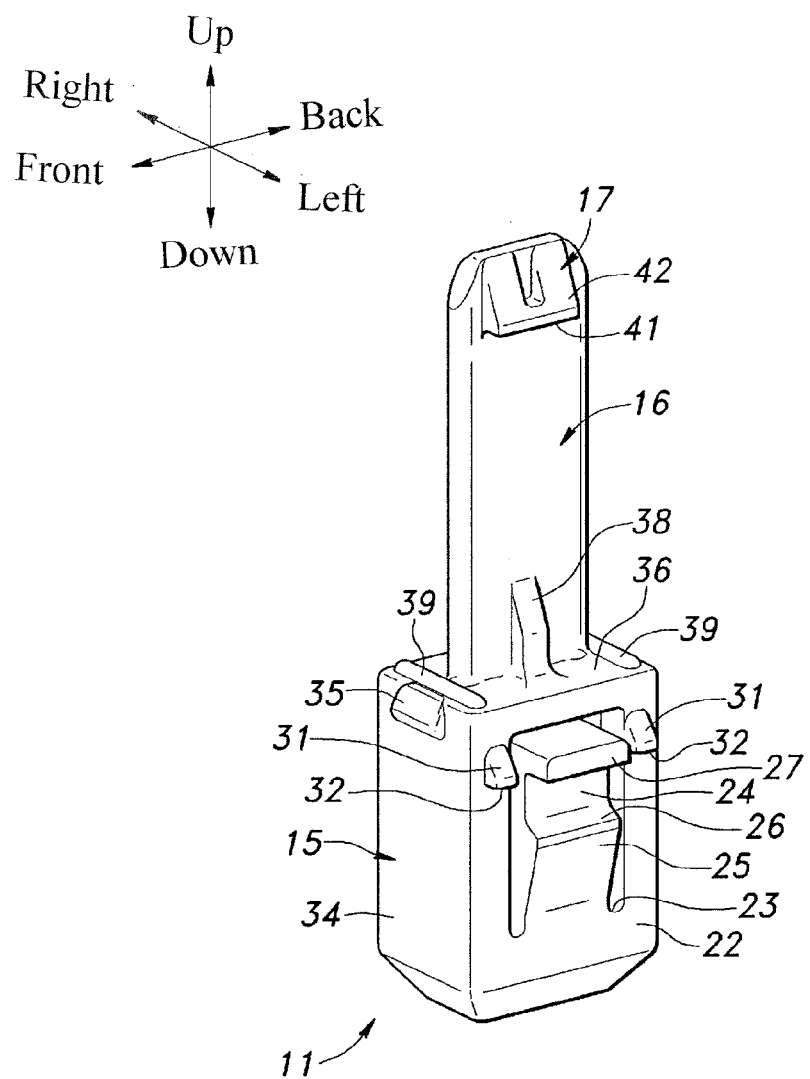
FIG. 2 is a perspective view showing a first member according to the embodiment.
Figure 3:
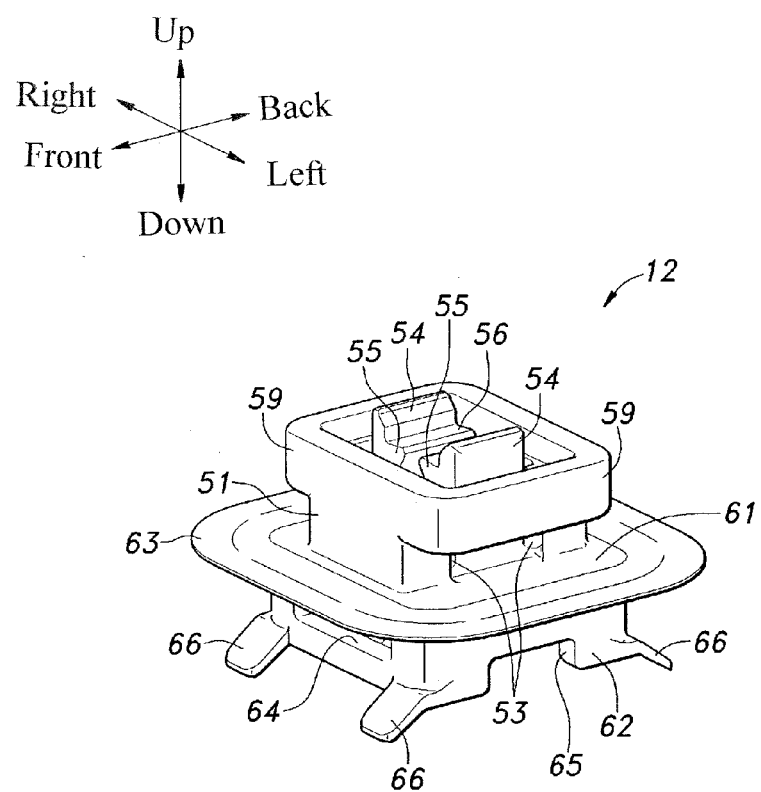
FIG. 3 is a perspective view showing a second member according to the embodiment.
Figure 4:
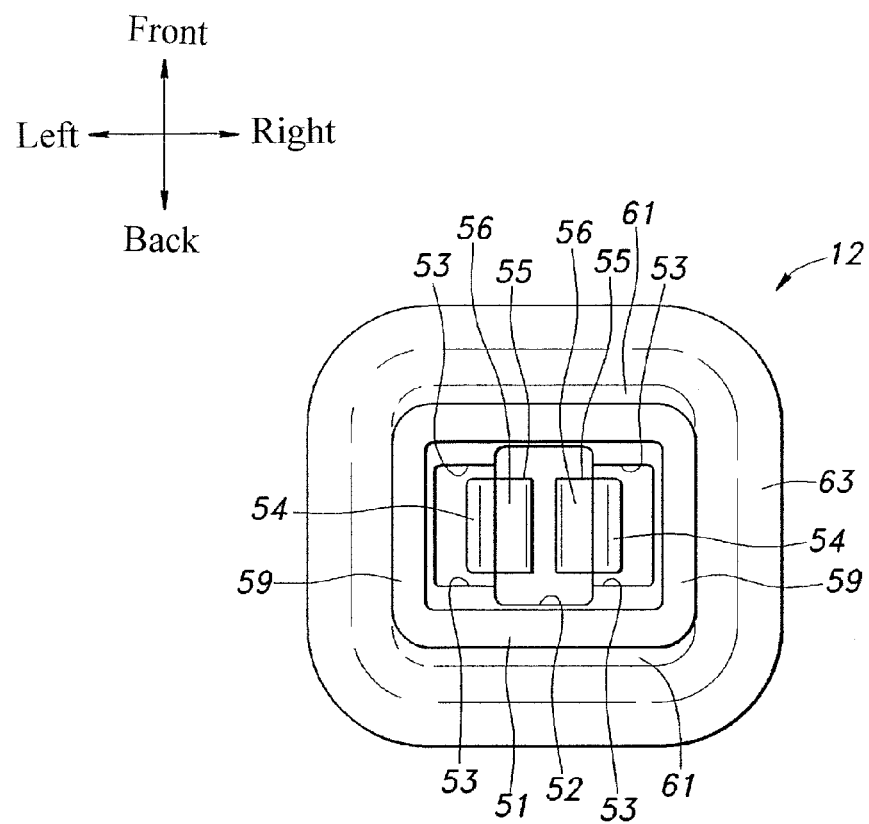
FIG. 4 is a plan view showing the second member according to the embodiment.
Figure 5:
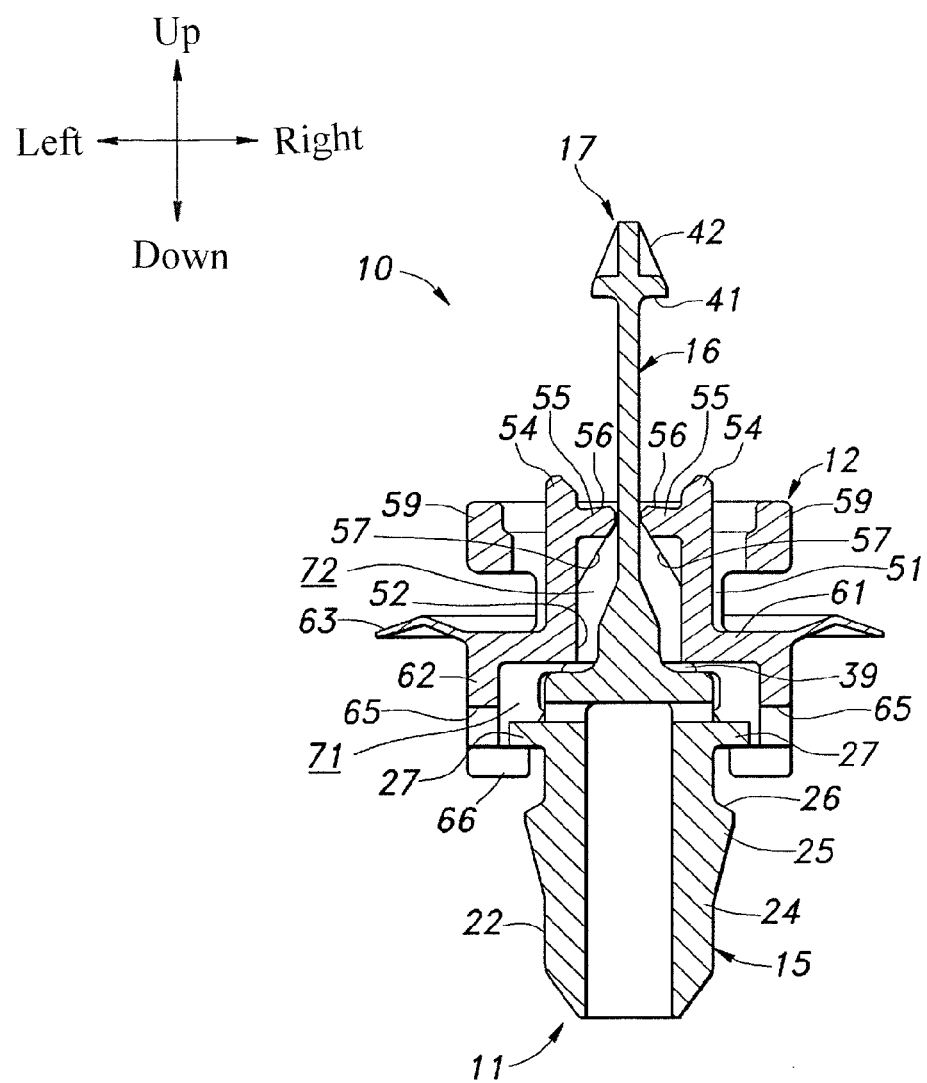
FIG. 5 is a cross-sectional view taken along the line V to V in FIG. 1.
Figure 6:
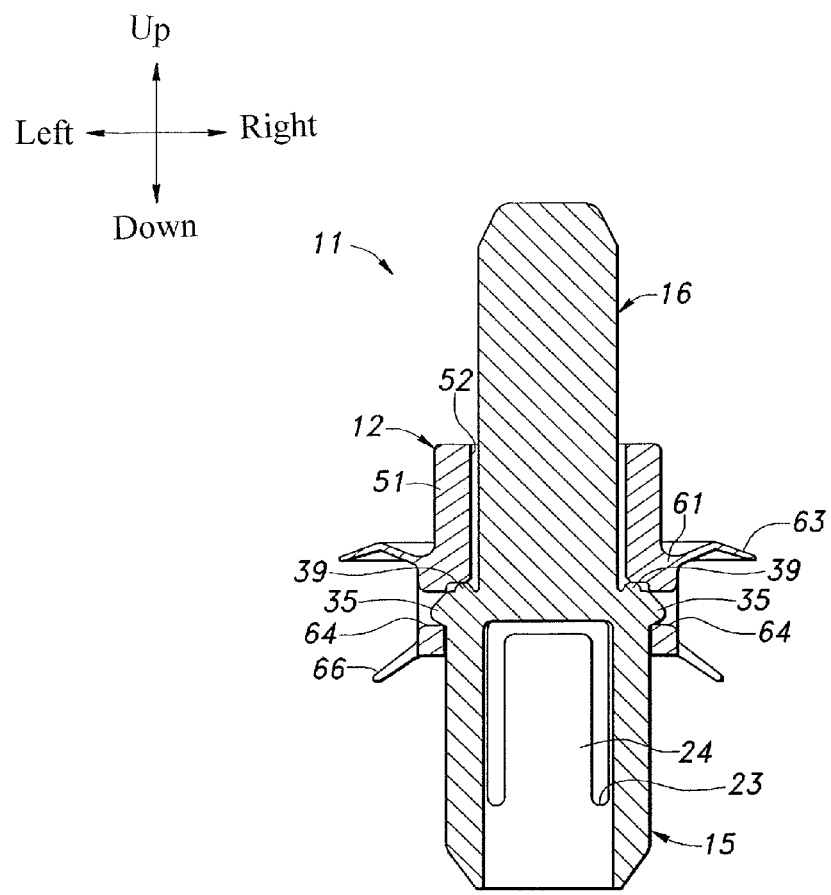
FIG. 6 is a cross-sectional view taken along the line VI to VI in FIG. 1.
Figure 7:
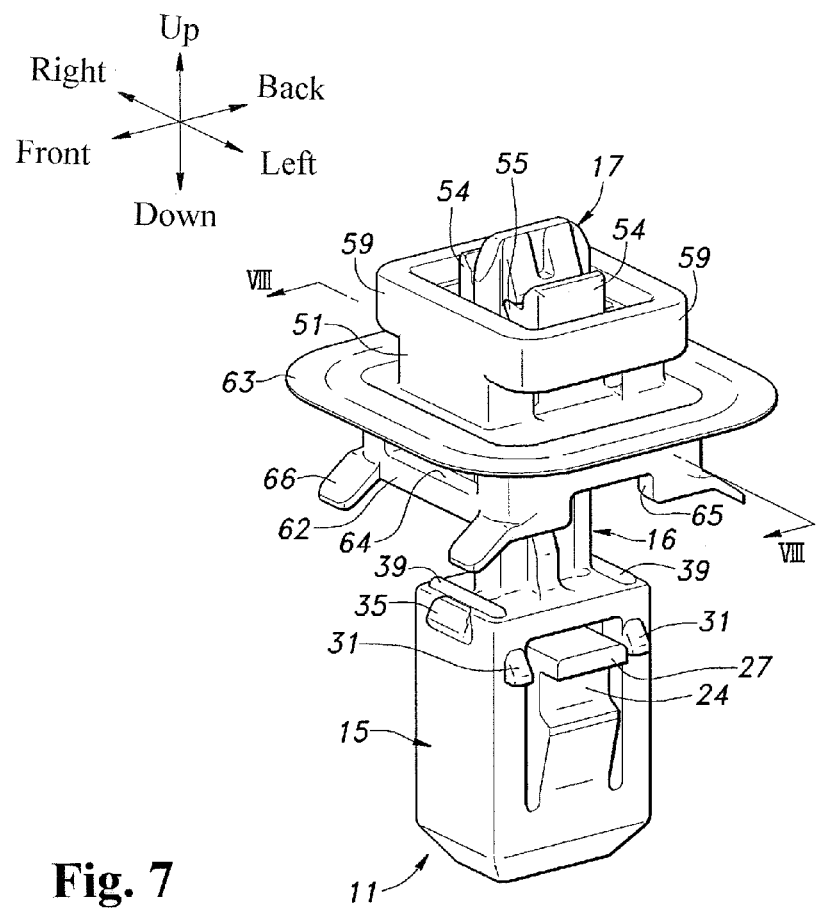
FIG. 7 is a perspective view showing a state after a displacement of the clip according to the embodiment.

As shown in FIGS. 2, 5, and 6, the first member 11 comprises a base portion 15, a protruding piece portion 16, and an expanded head portion 17 as a main structure element. The base portion 15 has a hollow box shape, and opens downward. An outer circumferential portion of a lower end portion of the base portion 15 is chamfered.

On right and left side surfaces 22 of the base portion 15, there are respectively formed slits 23 communicating an inner surface and an outer surface of the base portion 15. Each slit 23 has an inverted U shape which opens to a lower side viewed from a right-and-left direction, and forms a cantilever piece 24 extending upward in a portion sandwiched by both side portions of the U shape thereof. Each cantilever piece 24 bends (elastically deforms) so as to be capable of inclining to an inward and an outward of the base portion 15.

In an intermediate portion in an up-and-down direction of each cantilever piece 24, there are respectively formed claw portions 25 protruding to the outward of the base portion 15. Each claw portion 25 comprises a reverse stop surface 26 facing upward. Also, in an end portion (an upper end portion) of each cantilever piece 24, there is formed a pressing portion 27 protruding to the outward of the base portion 15.

Also, in a portion of a front side and a back side of a portion wherein the slits 23 of the right and left side surfaces 22 are formed, claw portions 31 and 31 are provided to protrude in a position maintaining a predetermined distance upward from the reverse stop surface 26 of the claw portion 25 in the up-and-down direction. Each claw portion 31 comprises an impulsive stop surface 32 facing downward. Front and back side surfaces 34 of the base portion 15 comprise convex portions 35 in an upper end thereof and in a center portion in the right-and-left direction.

The protruding piece portion 16 is formed in a plate shape having a face facing the right-and-left direction, and is provided to protrude upward from the center portion in the right-and-left direction of an upper surface 36 of the base portion 15. As shown in FIGS. 2 and 5, a width (a thickness of the protruding piece portion 16) in the right-and-left direction of the protruding piece portion 16 is obviously formed small relative to a width in the right-and-left direction of the base portion 15, and a width in a front-back direction of the protruding piece portion 16 is also formed slightly small relative to a width in the front-back direction of the base portion 15. It is preferable that a width in the right-and-left direction of the protruding piece portion 16 is one half or less relative to a width in the right-and-left direction of the base portion 15. Moreover, it is more preferable that the width in the right-and-left direction of the protruding piece portion 16 is one fifth or less relative to the width in the right-and-left direction of the base portion 15. The protruding piece portion 16 is made to be thin-walled so as to have a flexible property, and can be curved in the right-and-left direction. In a base end portion of the protruding piece portion 16, there is provided a rib 38 continuing to the upper surface of the base portion 15. Also, on the upper surface 36 of the base portion 15, there is formed a plurality of protruding pieces 39.

On right and left side surfaces in an end portion of the protruding piece portion 16, there are respectively formed the expanded head portion 17 protruding to the left and the right. Each expanded head portion 17 comprises an inverted stop surface 41 facing downward on a lower end, and in an upper portion of the inverted stop surface 41, there comprise sloping surfaces 42 facing upward and to right and left sides. Namely, the expanded head portion 17 is tapered as the expanded head portion 17 goes toward an end of the protruding piece portion 16.

As shown in FIGS. 3 to 6, the second member 12 comprises a square cylindrical cylinder portion 51 wherein a through hole 52, having a cross-sectional square shape wherein an axis line extends in the up-and-down direction, is formed. On mutually facing right and left side surfaces of the cylinder portion 51, there are respectively formed slits 53 two by two, communicating an outside of the cylinder portion 51 and the through hole 52, and also extending in the up-and-down direction, and whose upper ends thereof continue to an upper end of the cylinder portion 51. In a portion clamped by two slits 53 and 53 of each right and left side surfaces, there are respectively formed retaining pieces 54 having a cantilever piece shape whose base end continues to the cylinder portion 51, and also which extends upward, and protrudes more upward than the upper end of the cylinder portion 51. Each retaining piece 54 bends (elastically deforms) as the base end of the lower end portion so as to be capable of inclining and tipping in the right-and-left direction. In mutually facing portions near the upper end of each retaining piece 54, there are respectively formed claw portions (projections) 55 protruding toward a center of the through hole 52.

Each claw portion 55 comprises an inverted stop surface 56 facing upward on an upper portion thereof, and comprises a rib 57 continuing to the retaining piece 54 on a lower portion thereof. The rib 57 forms an inclined surface reaching a protruding end of the claw portion 55 from the retaining piece 54. While a distance between the protruding ends of each facing claw portion 55 is set larger than the thickness (the width in the right-and-left direction) of the protruding piece portion 16, the distance between the protruding ends of each facing claw portion 55 is set smaller than the distance (a width in the right-and-left direction of the expanded head portion 17) between two protruding ends of the expanded head portion 17.

On the respective upper portions of the right and left side surfaces of the cylinder portion 51, there are provided U-shaped collar portions 59 in a plan view bending and extending backward after protruding to the right-and-left direction from a front end portion thereof, and after that, further bending, and continuing to an upper-part back end portion of the right and left side surfaces. Each collar portion 59 is formed in the U shape in the plan view so as not to block outward inclining and tipping of the cylinder portion 51 of each retaining piece 54.

In a lower end of the cylinder portion 51, there is formed a quadrangular flange portion 61 extending outward. On an outer circumferential portion of the flange portion 61, there is provided to extend a circumferential wall portion 62 extending downward along the outer circumferential portion of the flange portion 61. Also, on the outer circumferential portion of the flange portion 61, there is formed a square circular elastic pressing portion 63 along the outer circumferential portion thereof. The elastic pressing portion 63 is a circular member formed in a V shape in such a way that a cross-sectional surface protrudes to an upper side, and can elastically deform. The elastic pressing portion 63 functions in the same manner as a disc spring.

On a mutually facing front-side side surface and a back-side side surface of the circumferential wall portion 62, there are respectively formed through holes 64 communicating an inside and an outside of the circumferential wall portion 62. The through holes 64 are formed in the center portion in the right-and-left direction of the front-side side surface and the back-side side surface. Incidentally, in another embodiment, as substitute for the through holes 64, depressed portions may be provided in inner surfaces of the front-side side surface and the back-side side surface of the circumferential wall portion 62. Also, on a mutually facing right-side side surface and a left-side side surface of the circumferential wall portion 62, there are respectively formed notch portions 65 continuing to a lower end of the circumferential wall portion 62. In a lower end portion of the circumferential wall portion 62, there is formed a plurality of elastic pieces 66 with a tongue piece shape protruding downward and to an outer side of the circumferential wall portion 62.

The first member 11 and the second member 12 are combined by inserting the end of the protruding piece portion 16 of the first member 11 into the through hole 52 from a lower side of the second member 12. At that time, the protruding piece portion 16 is disposed relative to the second member 12 in such a way that a planar portion thereof faces each retaining piece 54. In a process of inserting the protruding piece portion 16 into the through hole 52, the sloping surfaces 42 of the expanded head portion 17 press lower portions of the claw portions 55 of the retaining pieces 54 and the ribs 57, and while the retaining pieces 54 are being inclined and tipped to an outer side of the through hole 52, the protruding piece portion 16 is inserted. After the expanded head portion 17 passes through between both the claw portions 55, due to elasticity of the retaining pieces 54 themselves, the expanded head portion 17 returns to an original position. As shown in FIG. 6, an insertion of the protruding piece portion 16 into the through hole 52 is carried out until the protruding pieces 39 of the first member 11 abut against a lower end portion of the cylinder portion 51 of the second member 12. In that state, two respective convex portions 35 of the first member 11 are fitted into the through holes 64 wherein the second member 12 corresponds (the convex portions 35 are caught on the through holes 64), and the first member 11 and the second member 12 come to a state of being mutually locked (engaged). The convex portions 35 are locked in the through holes 64, so that the first member 11 and the second member 12 are maintained in a state wherein the protruding piece portion 16 protrudes the most from an upper end of the through hole 52. A state shown in FIGS. 1, 5, and 6 is an initial state of the clip 10. In that state, the pressing portions 27 come to a state of being disposed inside the notch portions 65, and end portions thereof are exposed to an outer surface of the clip 10.

As shown in FIG. 5, in the initial state of the clip 10, in the right-and-left direction, the base portion 15 includes a void (a play) 71 between the base portion 15 and the inner surface of the circumferential wall portion 62, and the protruding piece portion 16 includes a void (play) 72 between an inner surface of the through hole 52 and the claw portions 55. Also, an inner circumferential portion of the through hole 64 is large relative to an outer circumferential portion of the convex portions 35, and the convex portions 35 are in a state of being loosely fitted in the through holes 64. Consequently, the first member 11 and the second member 12 are connected to each other with a play (a wobbling), and can relatively rotate within a predetermined range as a center of the convex portions 35. Also, even in a case wherein sizes of the through holes 64 and the convex portions 35 approximately correspond, since the convex portions 35 or the through holes 64 slightly bend, the first member 11 and the second member 12 can relatively rotate within the predetermined range.

In the initial state of the clip 10, when the first member 11 is fixed, and a predetermined load acts on the second member 12 in a direction of pulling the protruding piece portion 16 from the through hole 52 (i.e., in a direction wherein the second member 12 is displaced to an expanded head portion 17 side), the convex portions 35 and the circumferential wall portion 62 bend, a locked state between the convex portions 35 and the through holes 64 is released, and the second member 12 is displaced to the expanded head portion 17 side. In the initial state, the first member 11 and the second member 12 can relatively rotate only a little bit as the center of the convex portions 35, so that even if the direction of the load acting on the second member 12 is slightly oblique relative to a protruding direction of the protruding piece portion 16, a twisting between the first member 11 and the second member 12 is prevented, and engagements between the convex portions 35 and the through holes 64 are smoothly released.

Figure 9:
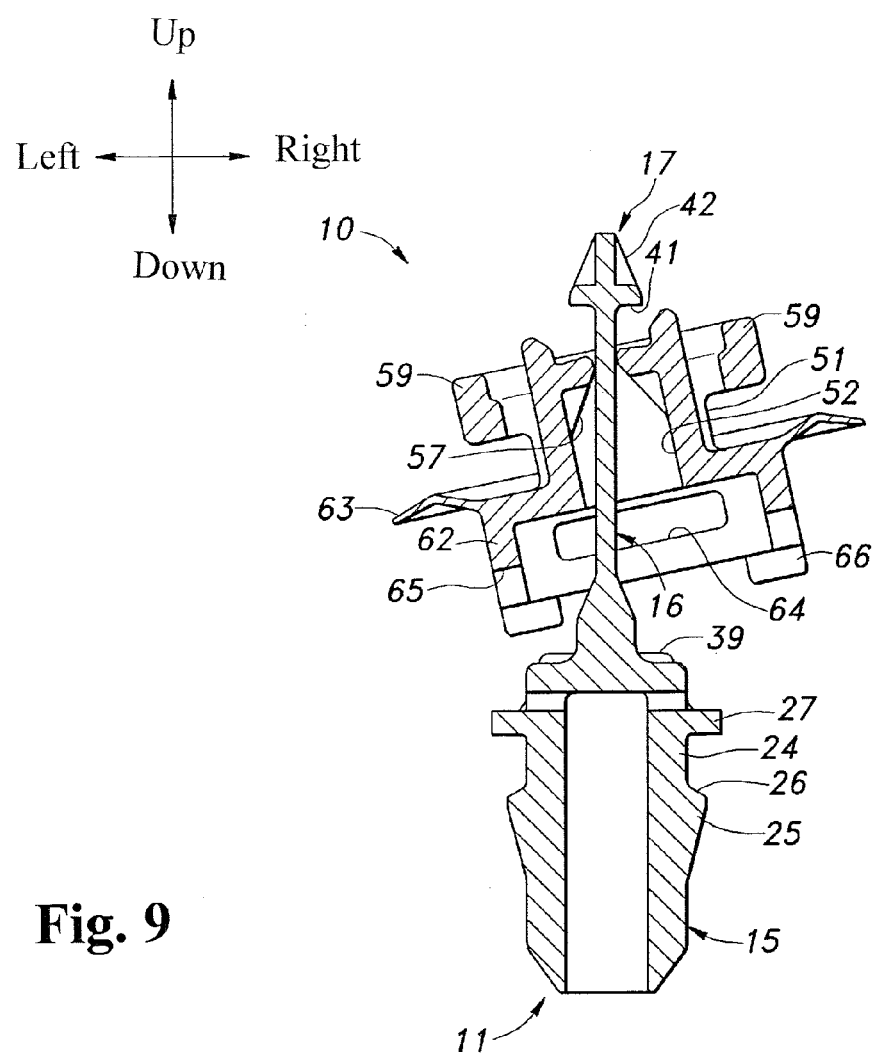
FIG. 9 is a cross-sectional view showing a state wherein the second member slopes relative to the first member.

Also, after the engagements between the convex portions 35 and the through holes 64 are released, in the first member 11 and the second member 12, a relative positional relationship is controlled at portions of the protruding piece portion 16 and the claw portions 55. Accordingly, as shown in FIG. 9, the second member 12 allows the axis line thereof to largely incline in the right-and-left direction relative to the protruding direction of the protruding piece portion 16. Also, the protruding piece portion 16 has the flexible property, and can bend in the right-and-left direction, so that the second member 12 can be displaced in a relatively free direction relative to the base portion 15 of the first member 11. Consequently, even if the direction of the load acting on the second member 12 is oblique to the protruding direction of the protruding piece portion 16 in the initial state, the second member 12 can be smoothly displaced relative to the first member 11.

Figure 8:
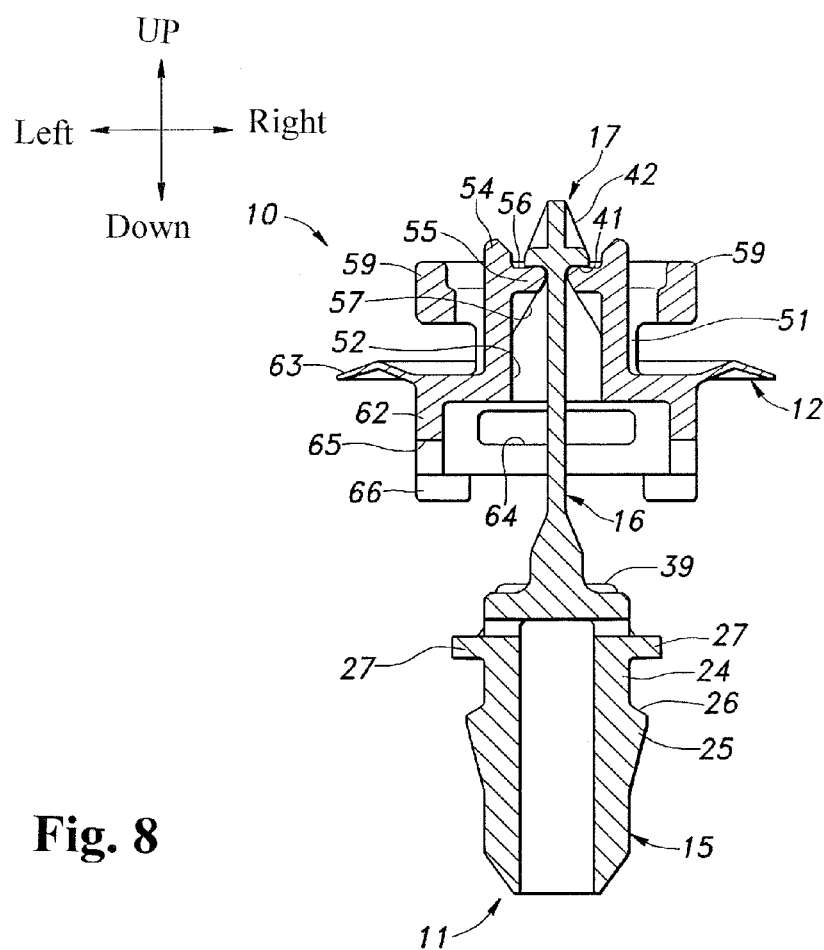
FIG. 8 is a cross-sectional view taken along the line VIII to VIII in FIG. 7.

As shown in FIG. 8, a displacement relative to the first member 11 of the second member 12 can be carried out until the inverted stop surface 56 of each claw portion 55 abuts against the inverted stop surface 41 of the expanded head portion 17. A state wherein the inverted stop surface 56 of each claw portion 55 abuts against the inverted stop surface 41 of the expanded head portion 17 is a state after the displacement. Incidentally, in a case wherein the first member 11 and the second member 12 are separated, in the state after the displacement, it is only necessary to incline and tip the retaining piece 54 by gripping an end of each retaining piece 54 in such a way that each retaining piece 54 is mutually separated.

Figure 10:
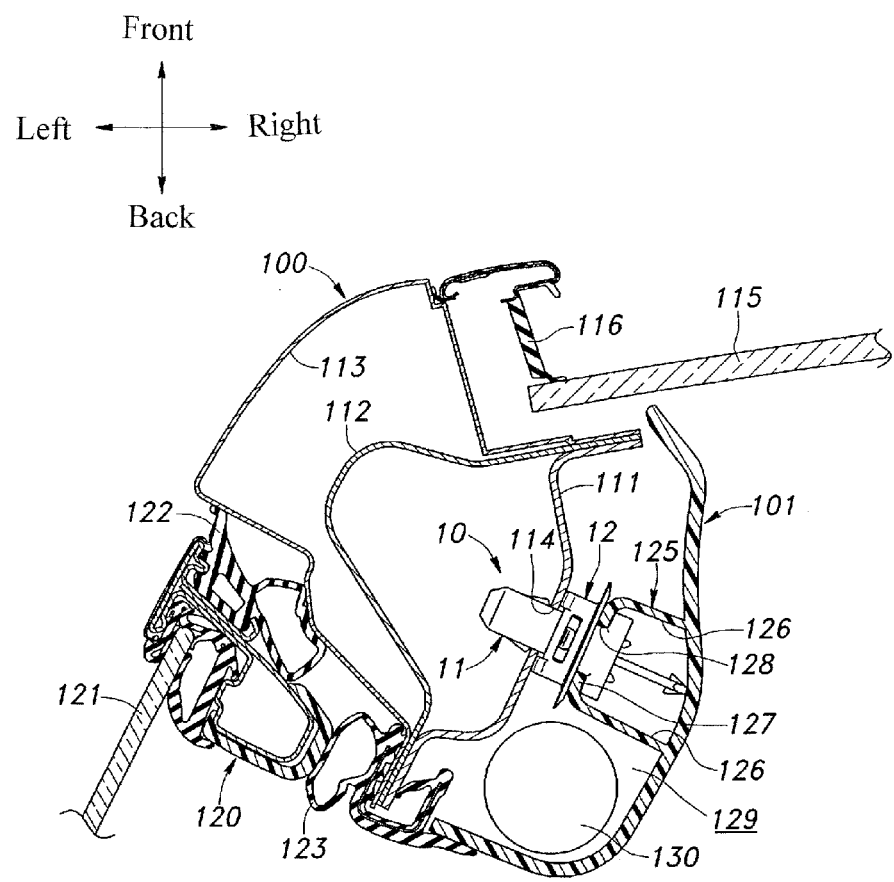
FIG. 10 is a cross-sectional view showing a pillar portion of a car body wherein the clip according to the embodiment is attached.

Next, a structure in which a garnish 101 is fixed to a front pillar upper 100 of the automobile using the clip 10 will be explained. FIG. 10 is a horizontal cross-sectional view showing a structure around the front pillar upper 100 on a left front side of the automobile. Coordinates in FIGS. 10 and 11 define a traveling direction of the automobile as the front.

As shown in FIG. 10, the front pillar upper 100 is structured by a front inner upper pillar 111 provided on a vehicle interior side; a front pillar upper stiffener 112 provided on a vehicle exterior side of the front inner upper pillar 111, and forming a closing structure with the front inner upper pillar 111; and an outer panel 113 provided on the vehicle exterior side of the front pillar upper stiffener 112, and forming the closing structure with the front pillar upper stiffener 112. In the front inner upper pillar 111, there is formed a through hole 114 in which the base portion 15 of the clip 10 fits in. The through hole 114 is formed in a square shape, and is formed in a size in which the base portion 15 can fit in with a predetermined tolerance.

On a front surface side of the front pillar upper 100, there is disposed a left end of a front glass 115, and a gap between both members is covered by a molding 116. At the back of the front pillar upper 100, there is provided a side door 120 comprising a side glass 121. In a gap between the front pillar upper 100 and the side door 120, there are disposed weather-strips 122 and 123.

On the vehicle interior side of the front inner upper pillar 111, there is disposed the garnish 101 as an interior member having a shape bulging to the vehicle interior side. The garnish 101 comprises a seat portion 125 on a reverse face (a face facing the vehicle exterior side) for attaching the clip 10. The seat portion 125 is structured by a pair of wall portions 126 and 126 provided to protrude on the reverse face of the garnish 101; a top board portion 127 bridged in such a way as to connect both ends of a pair of the wall portions 126 and 126; and a slit 128 formed in the top board portion 127. As shown in FIG. 1, in the slit 128, one end connects to an end portion of the top board portion 127. A width of the slit 128 is formed in the size in which the cylinder portion 51 can fit in with a predetermined tolerance, and also is formed smaller than a distance between protruding ends of both collar portions 59. A length of the slit 128 is formed in a length roughly corresponding to a length in the front-back direction of the cylinder portion 51. A thickness of the top board portion 127 is formed in a size wherein the top board portion 127 can be fitted between the collar portion 59 of the second member 12 and the flange portion 61.

In a void 129 formed between the front inner upper pillar 111 and the garnish 101, there is housed an air-bag 130 of a side curtain air-bag device in a folded state. The side curtain air-bag device comprises an inflator which is not shown in the figures, and when a collision of a vehicle is detected, the side curtain air-bag device detonates the inflator so as to inflate and expand the air-bag 130.

A method in which the garnish 101 is attached to the front inner upper pillar 111 using the clip 10 will be explained. First, as shown in FIG. 1, the clip 10 is slid in a direction of an arrow 201, and the cylinder portion 51 is inserted into the slit 128. The clip 10 clamps the top board portion 127 between the collar portion 59 and the flange portion 61. At that time, the elastic pressing portion 63 presses the top board portion 127 to a collar portion 59 side, and enhances a firmly attaching property between the second member 12 and the top board portion 127.

Figure 11:
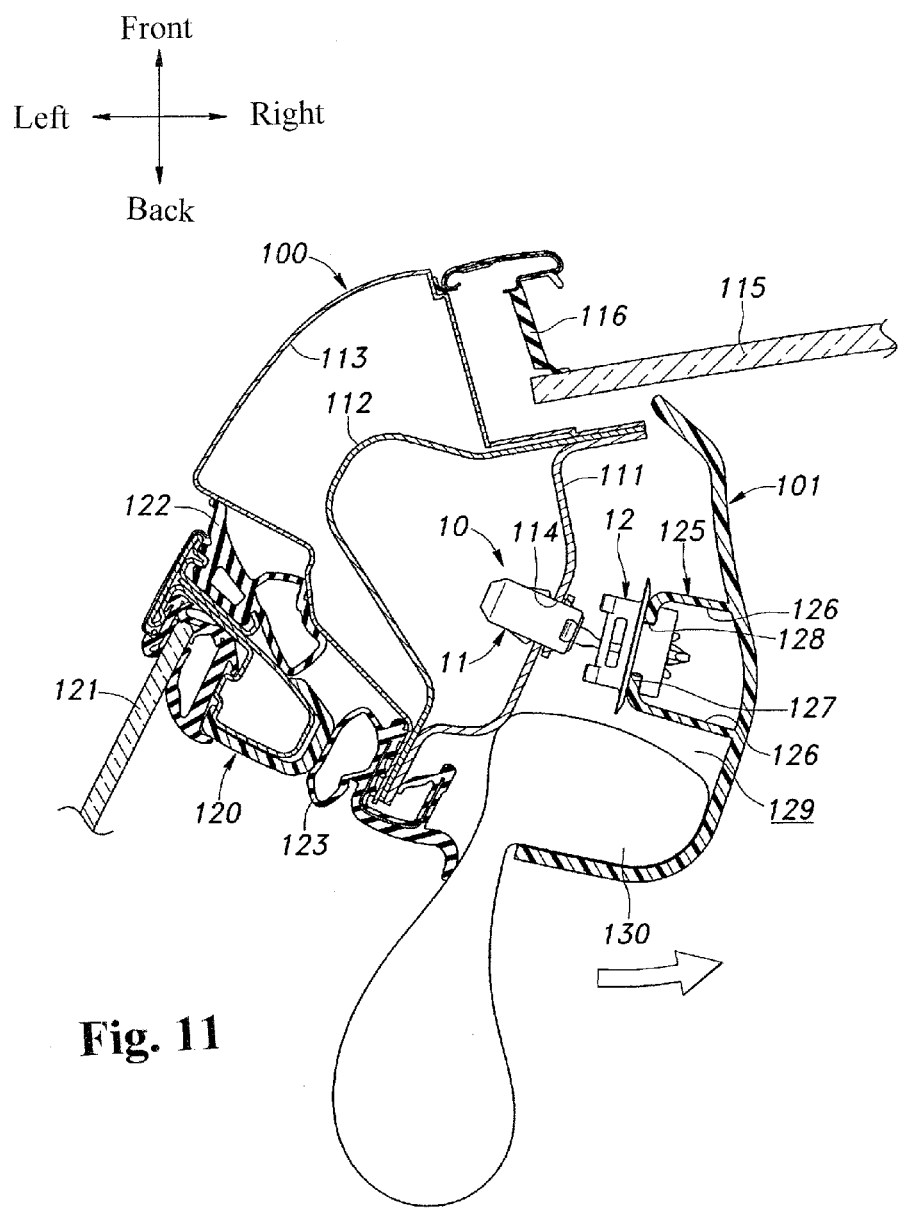
FIG. 11 is a cross-sectional view showing the pillar portion of the car body when an air-bag expands.

Next, the base portion 15 is moved in a direction of an arrow 202, and is inserted into the through hole 114 of the front inner upper pillar 111. At that time, the cantilever pieces 24 incline and tip to the inward of the base portion 15, and the claw portions 25 pass through the through hole 114. An insertion of the base portion 15 into the through hole 114 is carried out until the impulsive stop surfaces 32 of the claw portions 31 abut against a circumferential border portion of the through hole 114. In that state, the cantilever pieces 24 return to an initial position, the reverse stop surfaces 26 of the claw portions 25 face a reverse face side of the front inner upper pillar 111, and the front inner upper pillar 111 is clamped between the claw portions 31 and the claw portions 25. Also, each elastic piece 66 abuts against the front inner upper pillar 111 so as to prevent the second member 12 from wobbling. In the above-mentioned manner, as shown in FIG. 11, the garnish 101 and the front inner upper pillar 111 are connected through the clip 10. Incidentally, after the base portion 15 is inserted into the through hole 114, the cylinder portion 51 may be inserted into the slit 128. An engagement between the first member 11 and the front inner upper pillar 111, and an engagement between the second member 12 and the garnish 101 are carried out more solidly than the engagement between the convex portions 35 and the through holes 64.

In the above-mentioned manner, the front inner upper pillar 111 and the garnish 101, which are mutually connected through the clip 10, receive the expansion pressure of the air-bag 130 in a direction of separating from each other when the collision of the vehicle is detected, and the air-bag 130 inflates. The expansion pressure of the air-bag 130 is transmitted to the first member 11 connected to the front inner upper pillar 111, and the second member 12 connected to the garnish 101, so that the engagement between the convex portions 35 and the through holes 64 is released. Then, as shown in FIG. 11, the second member 12 is displaced along the protruding piece portion 16 until the second member 12 bumps into the expanded head portion 17. Thereby, the front inner upper pillar 111 and the garnish 101 are mutually separated only for a length of the displacement relative to the first member 11 of the second member 12, so that there is formed a gap between the front inner upper pillar 111 and the garnish 101. Through the gap, the air-bag 130 expands into a vehicle interior.

As shown in FIGS. 10 and 11, since the air-bag 130 is disposed in one portion of the void 129, the air-bag 130 inflates, so that a load acts on the second member 12 in a direction oblique to the protruding direction of the protruding piece portion 16. As mentioned above, in the clip 10 of the present embodiment, in a state wherein the convex portions 35 and the through holes 64 are engaged, the first member 11 and the second member 12 can be displaced (rotate) as the center of the convex portions 35, and in a state wherein the engagement between the convex portions 35 and the through holes 64 is released, the second member 12 is supported in the protruding piece portion 16 so as to be capable of inclining and tipping (sloping) relative to the protruding direction of the protruding piece portion 16. Since the protruding piece portion 16 can bend, even in a case wherein the load acts on the second member 12 in the direction oblique to the protruding direction of the protruding piece portion 16, the second member 12 can be smoothly displaced relative to the first member 11. Namely, the twisting between the second member 12 and the first member 11 is prevented, so that when a desired load acts on the clip 10, the clip 10 can change a relative position between the second member 12 and the first member 11. Thereby, at a normal time, the clip 10 can stably fix the garnish 101 to the front inner upper pillar 111. Also, when the air-bag 130 inflates, the clip 10 can deform (a positional change of the second member 12 relative to the first member 11) by the desired load so as not to prevent the air-bag 130 from inflating. Also, in a state wherein an engagement between the first member and the second member is released, the second member is allowed to slope further largely relative to the base portion of the first member so as to be capable of changing an angle of the garnish 101 relative to the front inner upper pillar 111, and capable of opening an opening for expanding the air-bag 130 to the vehicle interior further largely.

Although the explanation of a specific embodiment ends here, the present invention is not limited to the aforementioned embodiment, and can be broadly transformed. For example, the convex portions 35 can be provided in the circumferential wall portion 62 of the second member 12, and the through holes (concave portions) 64 engaging with the convex portions 35 may be provided in the base portion 15. Also, the protruding piece portion 16 is not limited to the plate shape or a belt shape, and may be formed in a bendable wire shape. Also, the engagement between the first member 11 and the front inner upper pillar 111, and the engagement between the second member 12 and the garnish 101 in the embodiment are one example, and the present invention can have heretofore known various engagement structures.

EXPLANATION OF SYMBOLS

10 . . . a clip, 11 . . . a first member, 12 . . . a second member, 15 . . . a base portion, 16 . . . a protruding piece portion, 17 . . . an expanded head portion, 35 . . . convex portions (engaging portions), 51 . . . a cylinder portion, 52 . . . a through hole, 53 . . . slits, 54 . . . retaining pieces (elastic pieces), 55 claw portions (projections), 59 . . . collar portions, 61 . . . a flange portion, 62 . . . a circumferential wall portion, 64 . . . through holes, 71, 72 . . . voids (play), 100 . . . a front pillar upper, 101 . . . a garnish, 111 . . . a front inner upper pillar, 112 . . . a front pillar upper stiffener, 113 . . . an outer panel, 114 a through hole, 125 . . . a seat portion, 126 . . . wall portions, 127 . . . a top board portion, 128 . . . a slit, 130 . . . an air-bag

What is claimed is:
1. A clip, comprising:
a first member including a base portion adapted to engage a first attached member, and a protruding piece portion protruding from the base portion and having a plate portion and an expanded head portion formed on an end portion of the plate portion, the expanded head portion having first projecting portions protruding outwardly from the plate portion to have a width wider than that of the plate portion and sloping surface portions inclining upwardly from the first projecting portions to taper toward an end of the expanded head portion; and
a second member including a cylinder portion adapted to engage a second attached member and having a first through hole formed therein to pass the protruding piece portion loosely therethrough, the cylinder portion being supported on the plate portion so as to be capable of being displaced in a protruding direction thereof and being retained on the plate portion between the base portion and the expanded head portion, and retaining pieces extending upwardly from a lower portion of the cylinder portion through the first through hole and having second projecting portions protruding inwardly therefrom to contact the first projecting portions,
wherein the clip mutually connects the first and second attached members, and when a load acts in a direction separating the first and second attached members from each other, the clip allows a separation of the first and second attached members only for a predetermined distance, wherein the base portion and the cylinder portion are connected through engaging portions which release an engagement with a load smaller than an engagement between the base portion and the first attached member and an engagement between the cylinder portion and the second attached member, wherein when the engagement of the engaging portions is released, the cylinder portion is supported such that an axis line of the cylinder portion inclines and tilts on the protruding piece portion relative to the protruding direction of the protruding piece portion, wherein the second attached member is configured to move upwardly together with the second member such that the first projecting portions contact the second projecting portions, and wherein the first member and the second member are separated when an end of each of the retaining pieces inclines and tilts in a direction opposite to each other.

2. A clip according to claim 1, wherein each of the retaining pieces includes an elastic piece which can be displaced in a direction orthogonal to an axis line direction of the first through hole, wherein each of the second projecting portions protrudes to a center side of the first through hole, and wherein the second projecting portions abut against the first projecting portions so as to retain the cylinder portion relative to the protruding piece portion.

3. A clip according to claim 1, wherein the protruding piece portion has a flexible property.

4. A clip according to claim 1, wherein in a state of being engaged by the engaging portions, the cylinder portion and the base portion mutually include a play therebetween.

5. A clip according to claim 1, wherein the base portion includes convex portions formed in an upper portion thereof and protruding outwardly therefrom, and the second member includes a circumferential wall portion extending downwardly from the cylinder portion and having second through holes formed through a front and back side surfaces thereof; and the convex portions fit into the second through holes, respectively, to form the engaging portions together with the second through holes.

6. A clip according to claim 5, wherein the cylinder portion includes a flange portion protruding outwardly from a lower portion thereof and having an elastic pressing portion protruding upwardly on an outer circumferential portion thereof.

7. A clip, comprising:
a first member including a base portion adapted to engage a first attached member, and a protruding piece portion protruding from the base portion and having a plate portion and an expanded head portion formed on an end portion of the plate portion, the expanded head portion having first projecting portions protruding outwardly from the plate portion to have a width wider than that of the plate portion and sloping surface portions inclining upwardly from the first projecting portions to taper toward an end of the expanded head portion; and
a second member including a cylinder portion adapted to engage a second attached member and having a first through hole formed therein to pass the protruding piece portion loosely therethrough, the cylinder portion being supported on the plate portion so as to be capable of being displaced in a protruding direction thereof and being retained on the plate portion between the base portion and the expanded head portion, and retaining pieces extending upwardly from a lower portion of the cylinder portion through the first through hole and having second projecting portions protruding inwardly therefrom to contact the first projecting portions, wherein the clip mutually connects the first and second attached members, and when a load acts in a direction separating the first and second attached members from each other, the clip allows a separation of the first and second attached members only for a predetermined distance, wherein the base portion and the cylinder portion are connected through engaging portions which release an engagement with a load smaller than an engagement between the base portion and the first attached member and an engagement between the cylinder portion and the second attached member, wherein when the engagement of the engaging portions is released, the cylinder portion is supported such that an axis line of the cylinder portion inclines and tilts on the protruding piece portion relative to the protruding direction of the protruding piece portion, wherein the second attached member is configured to move upwardly together with the second member such that the first projecting portions contact the second projecting portions, and wherein the first member and the second member are separated when an end of each of the retaining pieces inclines and tilts in a direction opposite to each other, wherein the base portion includes convex portions formed in an upper portion thereof and protruding outwardly therefrom, and the second member includes a circumferential wall portion extending downwardly from the cylinder portion and having second through holes formed through a front and back side surfaces thereof; and the convex portions fit into the second through holes, respectively, to form the engaging portions together with the second through holes, wherein the cylinder portion includes a flange portion protruding outwardly from a lower portion thereof and having an elastic pressing portion protruding upwardly on an outer circumferential portion thereof, and wherein the cylinder portion includes collar portions formed at side portions of an upper portion thereof and spaced from the flange portion; and the second attached member is adapted to engage between each of the collar portions and the flange portion.

8. A clip according to claim 7, wherein the base portion includes third projecting portions protruding outwardly therefrom, and the wall portion includes a plurality of elastic pieces protruding downwardly therefrom; and the first attached member is adapted to engage between each of the third projecting portions and each of the plurality of elastic pieces in a state wherein the base portion and the cylinder portion are engaged.

* * * * *